United States Patent
Allsbrook et al.

(10) Patent No.: US 12,041,127 B2
(45) Date of Patent: *Jul. 16, 2024

(54) ASSET SYNCHRONIZATION SYSTEMS AND METHODS

(71) Applicant: ClearBlade, Inc., Austin, TX (US)

(72) Inventors: David Aaron Allsbrook, Austin, TX (US); Steven Manweiler, Driftwood, TX (US); Sanket Deshpande, Austin, TX (US); Martin Pandola, Austin, TX (US)

(73) Assignee: ClearBlade, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/137,087

(22) Filed: Apr. 20, 2023

(65) Prior Publication Data

US 2023/0262120 A1    Aug. 17, 2023

Related U.S. Application Data

(63) Continuation of application No. 16/799,298, filed on Feb. 24, 2020, now Pat. No. 11,671,490, which is a continuation-in-part of application No. 16/357,779, filed on Mar. 19, 2019, now Pat. No. 11,652,741.

(60) Provisional application No. 62/942,131, filed on Nov. 30, 2019, provisional application No. 62/647,447, filed on Mar. 23, 2018.

(51) Int. Cl.
*H04L 67/1095* (2022.01)
*G16Y 30/00* (2020.01)

(52) U.S. Cl.
CPC .......... *H04L 67/1095* (2013.01); *G16Y 30/00* (2020.01)

(58) Field of Classification Search
CPC ..... H04L 67/1095; H04L 67/12; H04L 67/34; H04L 45/026; H04L 45/08; H04L 45/12; H04L 45/121
See application file for complete search history.

*Primary Examiner* — Zhensheng Zhang
(74) *Attorney, Agent, or Firm* — Bradley, Arant, Boult, Cummings LLP; Stephen H. Hall; Ryan Letson

(57) ABSTRACT

The present invention relates to IoT devices existing in a deployed ecosystem. The various computers in the deployed ecosystem are able to respond to requests from a device directly associated with it in a particular hierarchy, or it may seek a response to the request from a high order logic/data source (parent). The logic/data source parent may then repeat the understanding process to either provide the necessary response to the logic/data source child who then replies to the device or it will again ask a parent logic/data sources for the appropriate response. This architecture allows for a single device to make one request to a single known source and potentially get a response back from the entire ecosystem of distributed servers.

20 Claims, 10 Drawing Sheets

ASSET SYNCHRONIZATION SYSTEMS AND METHODS

CROSS REFERENCE TO RELATED APPLICATIONS

This application is a continuation of U.S. patent application Ser. No. 16/779,298, titled "Asset Synchronization Systems and Methods" and filed on Feb. 23, 2020, which claims priority to U.S. patent application Ser. No. 16/357,779, titled "System and Method for IOT Systems of Logic Across A Continuum of Computers" and filed on Mar. 19, 2019, which claims priority to U.S. Provisional Application Ser. No. 62/647,447, titled "System and Method for IOT Systems of Logic Across a Continuum," filed on Mar. 23, 2018. This application also claims priority to U.S. Provisional Patent Application Ser. No. 62/942,131, titled "Edge Synchronization Systems and Methods" and filed on Nov. 30, 2019. The entire contents of each of the foregoing are incorporated herein by reference in their entireties.

FIELD OF THE INVENTION

The field of the invention relates to a system and method for synchronizing information across an Internet of Things (IoT) hierarchy.

BACKGROUND

IoT is becoming more prevalent, and solutions are beginning to be a part of our everyday lives. Over the last few years, there are trends like MQTT, API-first, IoT Platform, Intelligent Edge. As the number of software applications have grown, many developers and application owners have stored and run their applications in the "cloud", e.g., in large remote server farms accessible over the internet.

While many of these cloud providers are structured to house and protect large amounts of data and applications, having applications run remotely has some disadvantages, including the cost of communicating to and from the cloud, as well as requiring an internet connection, and the time it takes to send or receive information from the cloud that may be hundreds or thousands of miles away. Moreover, in most instances, there is not a direct "connection" between a user of a particular software or app and the cloud. Rather, there may be a large number of hubs or "hops" for a user to ultimately connect to the desired cloud location. This can cause particular problems when there is a large amount of data or there are a lot of requests to and from the cloud. Considering the internet infrastructure, there may be a server that a person interacts with, but there are lots of "hops" along the way between a user's browser and that content. When looking at a static website a user may never actually even communicate with actual hosting server but instead a cached version stored in a CDN.

One example outside of the IoT space is Netflix Open Connect CDN. It takes a long time to pull all those movies and television shows from a central cloud to homes around the world. Thus, to address this, the Netflix Open Connect hardware local ISPs keep caches of content. This is a massive hardware/software build for Netflix specific to its use case, but moves the data from a single central location, to having multiple copies of content distributed geographically closer to its users. While IoT is different than streaming static video, IoT will be a tremendous user of bandwidth and demand high speeds.

Another potential disadvantage of running applications on remote devices is that there may be times when a remote device is not able to communicate with other devices of the network, a developmental or operational platform, or the cloud. This is problematic because the "disconnected" device cannot send or receive information which may be critical to functioning of the device and on which other devices of the system may depend. In addition, when a connection is restored, an application running on the device may have experience problems providing the appropriate data, and may lack updates needed to allow the application to run properly. Improved techniques for asset synchronization in distributed IoT systems are generally desired.

SUMMARY OF THE INVENTION

Applicant has developed systems and methods involving Edge Computer Continuum, representing many layers of computer infrastructure made available to be used as part of the whole IoT application to provide a hierarchy-based, fastest path to every device. The various hardware located at the various hubs between a user and the server that the user interacts with, for example, the routing gear, the cell phone towers, and the satellites, all represent computing opportunities for IoT applications.

Applicant's systems and methods utilize the ubiquitous computing in today's IoT capable world to implement an edge compute continuum. According to Wikipedia, "Ubiquitous computing" (or "ubicomp") is a concept in software engineering and computer science where computing is made to appear anytime and everywhere. In contrast to desktop computing, ubiquitous computing can occur using any device, in any location, and in any format. A user interacts with the computer, which can exist in many different forms, including laptop computers, tablets and terminals in everyday objects such as a refrigerator or a pair of glasses. The underlying technologies to support ubiquitous computing include Internet, advanced middleware, operating system, mobile code, sensors, microprocessors, new I/O and user interfaces, networks, mobile protocols, location and positioning, and new materials."

Applicant's systems and methods use these edge offerings, capable of chaining together. Ultimately, instead of costly on-off solutions made by large clouds or enterprise vendors, middleware capable of making this task easy and transparent for end developers is used.

Other objects and advantages of the present invention will become obvious to the reader and it is intended that these objects and advantages are within the scope of the present invention.

To the accomplishment of the above and related objects, this invention may be embodied in the form illustrated in the accompanying drawings/pictures, recognizing however, that the drawings are illustrative only, and that changes may be made in the specific construction illustrated and described within the scope of the appended claims.

BRIEF DESCRIPTION OF DRAWINGS

Various other objects, features and attendant advantages of the present invention will become fully appreciated as the same becomes better understood when considered in conjunction with the accompanying drawings.

An appendix is attached and incorporated herein by reference in its entirety and includes additional figures of various embodiments.

DETAILED DESCRIPTION

While the invention has been described with respect to a limited number of embodiments, those skilled in the art, having benefit of this disclosure, will appreciate that other embodiments can be devised which do not depart from the scope of the invention as disclosed here. Accordingly, the scope of the invention should be limited only by the attached claims. Additionally, while much of the description herein relates to mobile apps that interact with mainframe/enterprise/back end systems, the invention is equally applicable to mobile apps that do not interact with such systems.

The present invention provides a system and method for constructing a complete definition of a backend requirements model that can be automatically accessed and interpreted, and generated into a mobile consumable API for creation of mobile applications. The mobile consumable API can be provided and made available to mobile app developers on a separate, stand-alone platform, and may act as an intermediary between the mobile app and the primary mainframe/enterprise/back end system.

Various embodiments may have one or more of the components outlined below.

Figure 1:
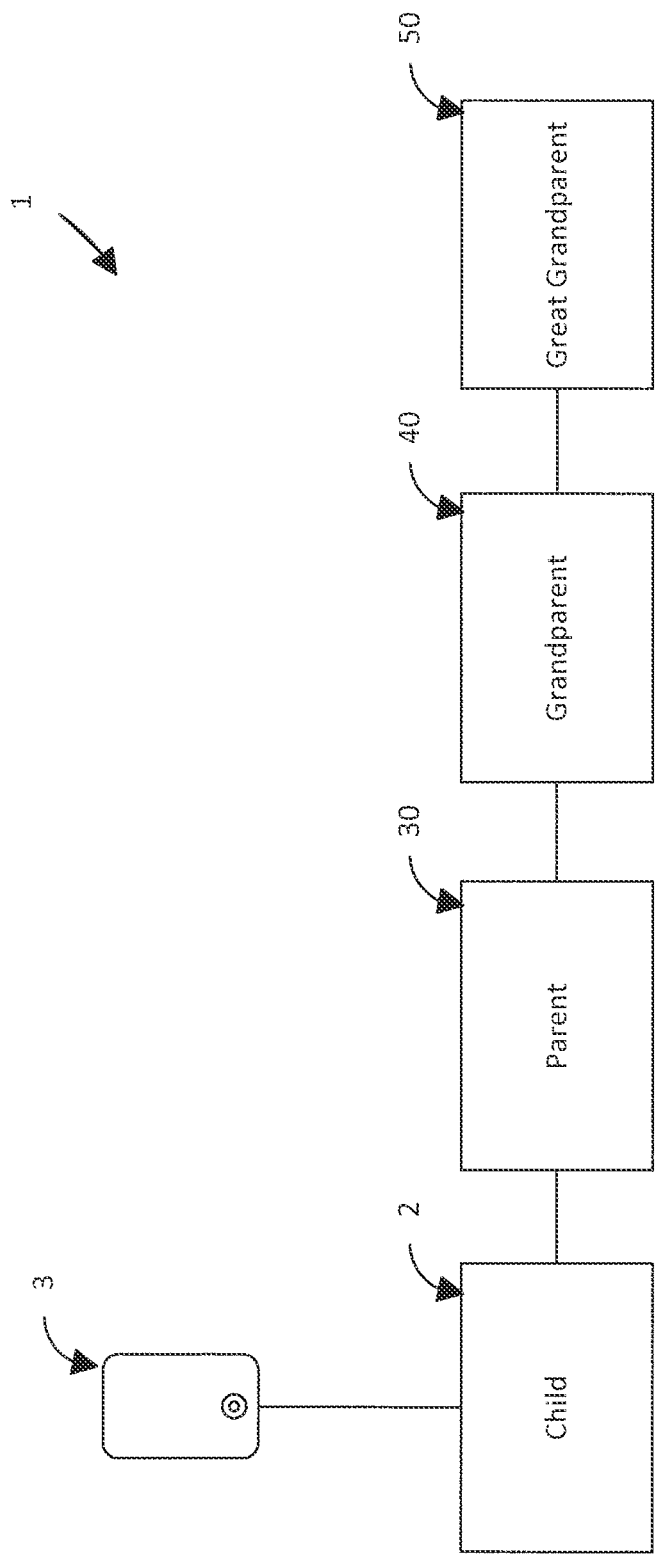
FIG. 1 depicts a deployed ecosystem of IoT devices in accordance with some embodiments of the present disclosure.

IoT devices existing in the deployed ecosystem 1 will have multiple requests for data and updates from their state. This information must be communicated in an efficient method reducing redundancy, execution time and errors. To achieve this, a device (e.g., device 3 of FIG. 1) must be able to request information from or give information to a logic/data source (e.g., child 2 in FIG. 1). A logic/data source may be similar to a server application. In order to meet speed or data requirements, the logic/data source child 2 may be able to respond to the device 3 directly or it may understand that the request must be met by a higher order logic/data source (a "parent," such as parent 30 in FIG. 1). It may need the parent's 30 source due to additional requirements like ability to compute machine learning algorithms, access to secured third-party systems, or need to share information with other logic/data sources (e.g., grandparent 40 or children 4, and 6 in FIG. 2).

The logic/data source parent 30 may then repeat the understanding process to either provide the necessary response to the logic/data source child 2 who then replies to the device 3 or it will again ask a parent logic/data source (e.g., parent 30) for the appropriate response.

Figure 2:
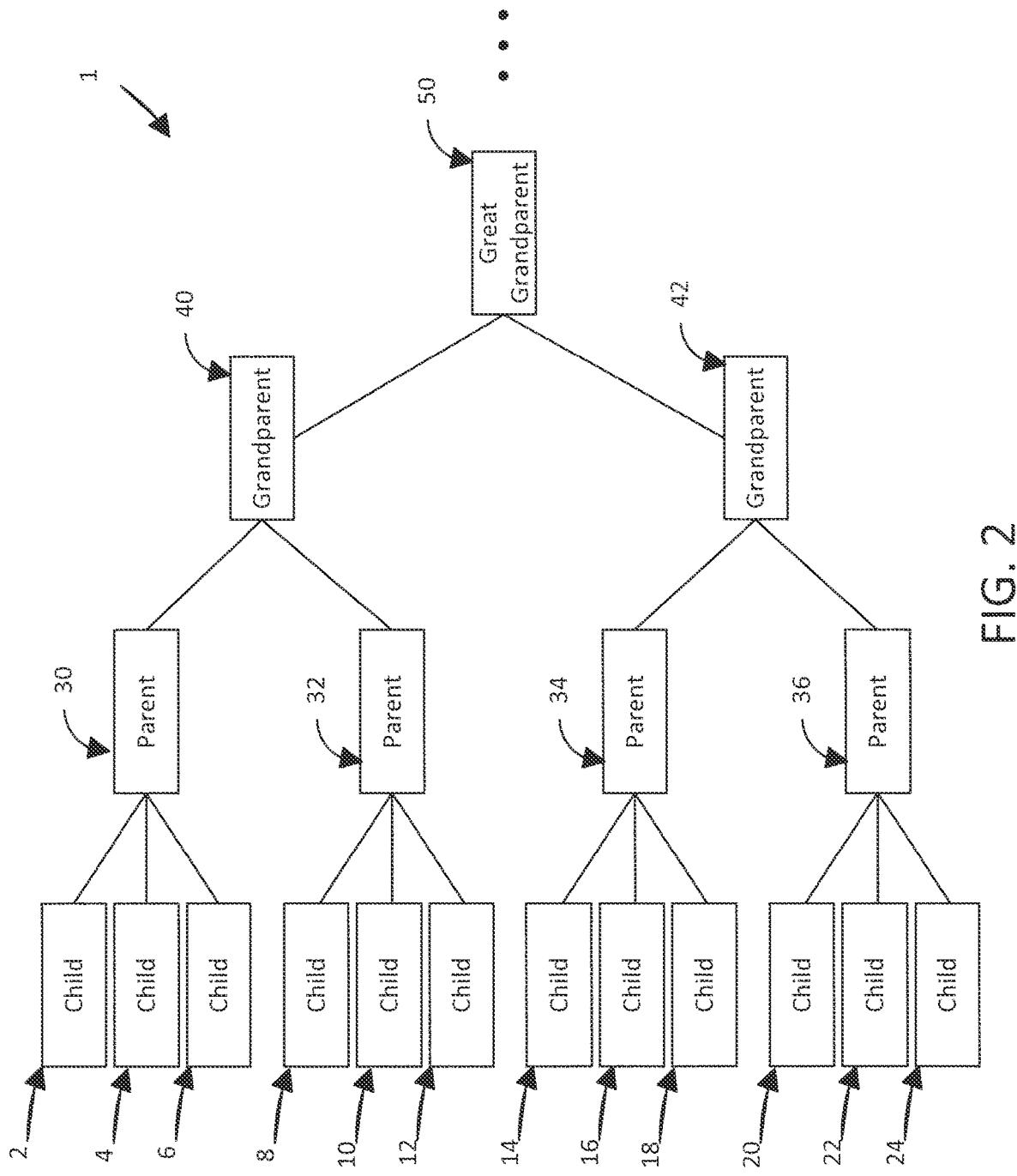
FIG. 2 is one embodiment showing one hierarchy of different computers in accordance with some embodiments of the present disclosure.

The goal of such an architecture allows for a single device, such as device 3 to make one request to a single known source (e.g., child data source 2) and potentially get a response back from the entire ecosystem of distributed servers (e.g., parent 30, grandparent 40, great grandparent 50, or any of the other various sources depicted in FIG. 2).

A device 3, also referred to herein as a "computer," may be included in a hierarchy that may be described as having layers, with computers in a particular layer being characterized as a child computer (e.g., children 2-24 in FIG. 2), the next layer as parent computers (e.g., parents 30-36 in FIG. 2), the next layer as grandparent computers (e.g., grandparents 40-42 in FIG. 2), the next layer as great grandparent computers (e.g., great grandparent 50 in FIG. 2), and so on for as many layers as may be needed or desired. An exemplary embodiment of one hierarchy is shown in FIG. 2. The computers may have operating systems, processors, RAM, and some database or storage. These computers can exist in many different forms, including desktop computers, laptop computers, tablets, smart phones, and terminals in everyday objects such as a refrigerator, thermostat, and other internet connected smart devices. The underlying technologies supporting this distributed computing include the internet, middleware, operating system, mobile code, sensors, microprocessors, new I/O, and user interfaces, networks, mobile protocols, location and positioning, and new materials.

The various computers across this continuum 1 of computers may be coupled to or communicate with each other via a network, such as the internet, local area network (LAN), wide area network (WAN), or the like. The network may include satellite communication, radio, and other ways to send or communicate data. The computers may include applications or programs stored in memory and executed on a processor. In some embodiments, the continuum 1 can be implemented on a UNIX-based system or other system. The systems and methods described in U.S. Pat. No. 9,038,015, the entire contents of which are hereby incorporated by reference, can be used to implement some aspects of the present disclosure.

In the past, the systems and methods described in U.S. Pat. No. 9,038,015 would likely be implemented in the cloud. However, using the system and method for IoT systems of logic across the continuum 1 of computers as discussed herein can result in faster processing, less expense, and more reliability.

At the various computers, or hubs described herein, embodiments may be implemented in code and may be stored on at least one storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

Embodiments of the invention may be described herein with reference to data such as instructions, functions, procedures, data structures, application programs, configuration settings, code, and the like. When the data is accessed by a machine, the machine may respond by performing tasks, defining abstract data types, establishing low-level hardware contexts, and/or performing other operations, as described in greater detail herein. The data may be stored in volatile and/or non-volatile data storage. The terms "code" or "program" cover a broad range of components and constructs, including applications, drivers, processes, routines, methods, modules, and subprograms and may refer to any collection of instructions which, when executed by a processing system, performs a desired operation or operations. In addition, alternative embodiments may include processes that use fewer than all of the disclosed operations, processes that use additional operations, processes that use the same operations in a different sequence, and processes in which the individual operations disclosed herein are combined, subdivided, or otherwise altered.

In one embodiment, use of the term control logic includes hardware, such as transistors, registers, or other hardware, such as programmable logic devices. However, in another embodiment, logic also includes software or code. Such logic may be integrated with hardware, such as firmware or micro-code. A processor or controller may include control logic intended to represent any of a wide variety of control logic known in the art and, as such, may well be implemented as a microprocessor, a micro-controller, a field-programmable gate array (FPGA), application specific integrated circuit (ASIC), programmable logic device (PLD) and the like.

In existing systems and methods, most applications and information is stored in the cloud in large cloud storage and computing farms. This can cause problems with security, performance, scalability, offline support, and have tremendous impacts on cost.

Figure 3:
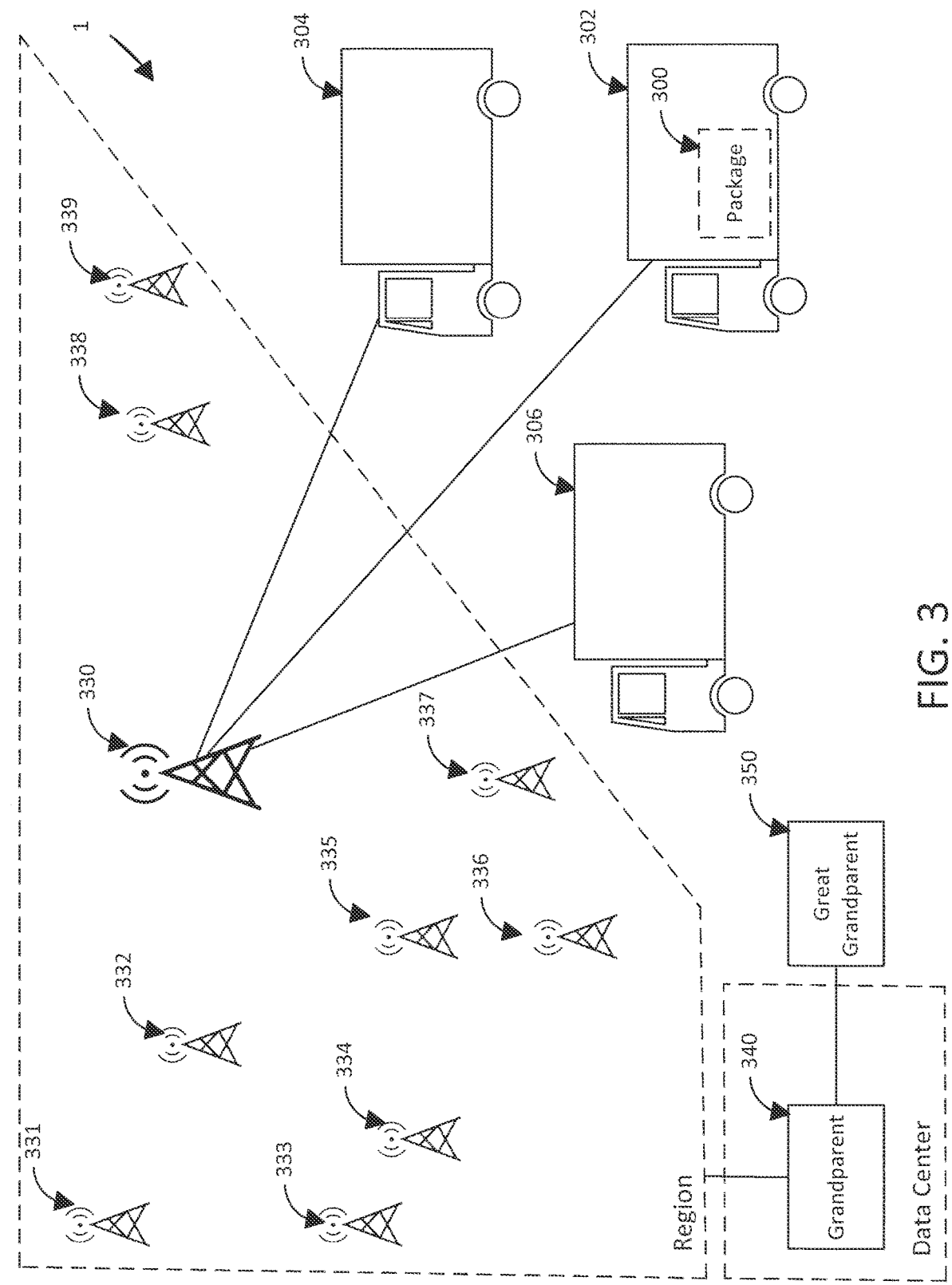
FIG. 3 depicts a deployed ecosystem of IoT devices for package tracking in accordance with some embodiments of the present disclosure.
Figure 4:
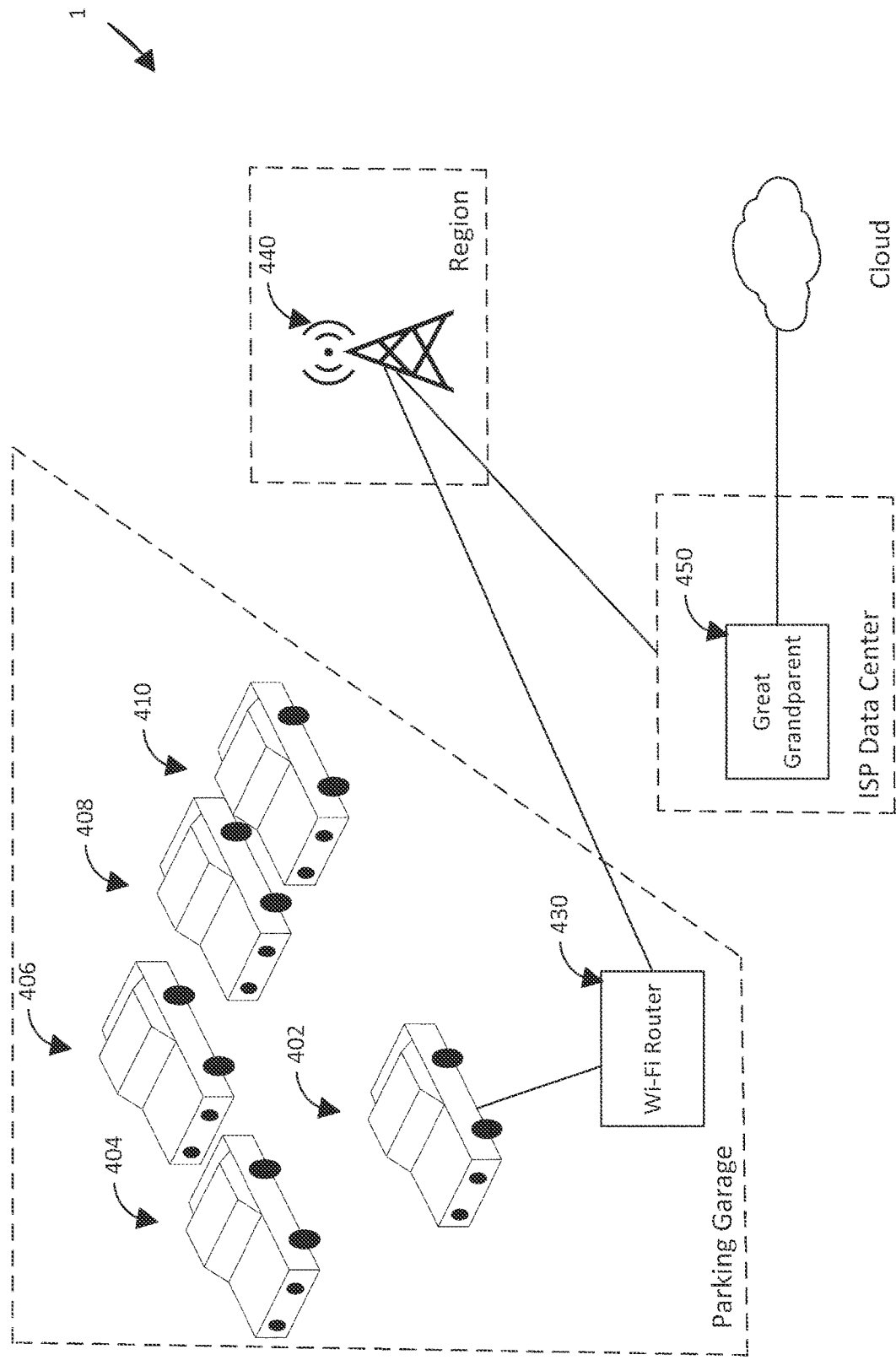
FIG. 4 depicts a deployed ecosystem of IoT devices for traffic monitoring in accordance with some embodiments of the present disclosure.

As one example implementation and embodiment and with reference to FIG. 3, a delivery company may have a need to track and be able to report certain information associated with packages 300 it is handling. A particular delivery truck may have a truck computer 302 which can interact with the packages on board (e.g., package 300). The delivery truck may have information stored on the local truck computer 302 that includes how long the package has been on the truck, and where it needs to be delivered. However, a user within the delivery company (for example, the truck operator) may want or need to know from whom the package is sent. This information is not stored by the truck computer (the "child computer" 2 in the hierarchy described above), so it seeks that information from the computer that is up one level from it, or a parent computer (e.g., parent 30). In this embodiment, that parent computer might be a computer associated with a cell phone tower 330 (FIG. 3). The parent computer 330 is programmed to determine whether it has the data stored, namely from whom the package is sent, necessary to provide the answer to the child computer/truck computer 302. If it does not, it may seek that information from other child computers (e.g., truck computers 304, 306) with which it is associated and connected with in the hierarchy, or it can seek that information from the next higher computer in the hierarchy (e.g., a grandparent computer 340), which may be a larger regional data center computer that covers a specific region (and may be containing ten (10) different cell phone tower hubs, e.g., hubs 331, 332, 333, 334, 335, 336, 337, 338, and 339). The grandparent computer 340 is similarly programmed to determine whether it has the data stored, and if it does not, it may seek that information from other parent computers with which it is associated and connected with in the hierarchy, or it can seek that information from the next higher computer in the hierarchy (a great grandparent computer 350).

Similarly, assume that an application running on the parent computer/cell phone tower hub needed to know how long a particular package (e.g., package 300) has been on the truck, such as truck 302. If that data is not stored at the parent computer/cell phone tower hub (e.g., hub 330), it could seek that information from all of its child computers (e.g., all the trucks 304, 306 that are associated with this particular parent computer/cell phone tower hub 330) and/or the grandparent (data center grandparent 340). Since that information is stored (in this example) in the truck 302 that has the particular package 300, the application running on the parent computer/cell phone tower hub 330 can obtain that information without having to go to the cloud.

Thus, some hubs in this ecosystem 1 may contain various aspects of information. In other words, the child computers/truck computers 302, 304, 306 may only retain information A, B, and C, the parent computer/cell phone tower hub 330 may retain information C, D, E, and F, and the great grandparent computer 350/regional data center 340 may retain A, F, G, H, I, J, and K, and other information is contained further up the chain. This configuration effectively deploys the information provider in various places throughout the ecosystem 1.

In this example, the truck 302 does not have to be configured to be able to seek information from the cell phone tower hub 330, the regional data center 340, and other potential sources of the information it seeks—rather it just has to be able to be configured to seek the requested information from its one connection to the cell phone tower hub 330. If the data sought is located at a hub computer up three levels (e.g., great grandparent 350), the truck computer 302 is unaware of that, and it does not matter to the truck computer 302.

This structure provides a number of technological solutions to some technological problems associated with traditional configurations and data flows. It can provide more real-time answers because the data requests are normally not required to be sent to and received from the "cloud", which is often hundreds or thousands of miles away. While the processing time for traditional requests is normally not minutes or hours, for some real-time applications, differences in seconds or even milliseconds of response times can make a significant difference. Additionally, having the data more localized can allow the requested information/connection if the connection to the cloud goes off line or is unavailable. Moreover, every time a request is sent to or information received from the cloud, costs are incurred. As a practical matter, for each "hop" in a network from a user's device to the cloud, there are costs that are incurred. When there are thousands, hundreds of thousands, or more requests and transmittals across the internet to and from the cloud, the costs can be substantial. By deploying the various information providers in a more distributed and localized fashion, the technological challenges and costs associated with storing and interacting with the cloud can be minimized.

The specific hub computer (i.e., the child computer 2, parent computer 30, grandparent computer 40, etc.) can be programmed or have logic that determines what data is or should be stored locally on that particular computer. The edge process described in U.S. Pat. No. 9,038,015 can be run on each computer. The computer can be a gateway, server, personal device, laptop, or any other type of computer. These computers can have rules that dictate how data and information is stored, transmitted, and the communication between hubs on different hierarchy levels. One or more of the computers can have algorithms that will implement the how, when, and the order of the communication between computers in the hierarchy. In various embodiments, those algorithms may include one or more of (a) cost efficient option (i.e., cheapest way to get data); (b) time performance optimization option (i.e., quickest way to get data); (c) priority (what communication layer should be used, e.g., satellite, radio, etc.); and/or (d) the order (i.e., do I check with parents first, children computers 5 first, etc.)

As another example of one embodiment of the invention, a car 402 running an IoT traffic application (child computer 2 in this example) wants to know the status of traffic on I-35 near Austin, it may first ask the Wi-Fi router 430 in the parking garage 400 (parent computer 30). If the edge/application running in the Wi-Fi router 430 has recently answered that question and has it stored in memory, it may rapidly respond, otherwise it may reach upward to the cell phone tower 440 (grandparent computer 40), where another edge/application sits with a broader set of constituents (e.g., other towers in the region, as illustrated in FIG. 3). It again may answer a traffic request if it has a recent information or it will ask the local ISP data center 450 (great grandparent computer 50). This ISP data center, is actually the target of local traffic data, meaning the status of the cars is sent to the ISP as it moves to the cloud. Rather than having to send the information up to the cloud to process and analyze the ISP is actually able to run the cloud logic locally and leverage the capability. This means that a serverless function that used to only run in the cloud now runs right where the data is closest and ingested. Now the ISP data center 450 can push that summary back up to a cloud so that other cities have access to traffic information, or it can keep it local, not wasting more computation resources. Additionally the original car 402 who made the request never had to know how the traffic question was answered, it simply asked and the application optimized itself and returned the information in the optimal manner.

In the traditional methodology, there might be a smart traffic application that assumes all cars are using 3G. All cars send their data to a local cell tower hub (local), which may send the data to a state hub, which may send the data to a regional hub, and which may then send it to a national cloud storage hub, for example, the Amazon cloud storage facility in Virginia. This requires quite a few "hops" from each node in the network, which can result in delays, and be costly over time.

Again, there is software running on these edge computers that is specific to each of these different applications. In the above example, a third party would write the traffic application and it is designed and configured to preferably optimize the hierarchy, where data is stored, where it is processed, etc. In other words, it is structured so that data elements A, B, and C, are stored at the child level (cars 402-410), elements D, E, and F are stored at the parent level (e.g., tower hub 440), and processing of X, Y, and Z are addressed at the parent level (hub 440). In some embodiments, requirements, data storage, and processing can be dynamically reallocated and/or deployed. For example, if a system is initially set up to store data element J at the grandparent level, but the system detects that child computers are requesting that data at a certain level (e.g., more than 10 times an hour), the system may dynamically redeploy and reallocate so that data element J is stored at the parent 10 level to minimize response times and reduce costs. Similarly, the system can also be predictively deployed or reallocated. For example, if the system has access to data that the temperature will be 100 degrees in about five days, the system may provide instructions to buy electricity now at a cheaper price.

In some embodiments, the system and method is configured to be take advantage of unstructured/unorganized communication. While a communication model where everyone (or every computer) speaks to everyone is great for a social network, it fails when it comes to enforcing truth and guaranteeing task completion. Consequently, the Edge Continuum of some embodiments contemplated by applicant remains a better implementation by forcing a hierarchy, guaranteeing a source of trust, and ensuring that every device that sends data or needs data gets an accurate responsive channel of communication.

IoT will become a reality in more and more everyday products, homes and businesses. As the momentum builds with more silicon providers making it cheaper to distribute accordingly, there will be a demand to better utilize the infrastructure.

Figure 5:
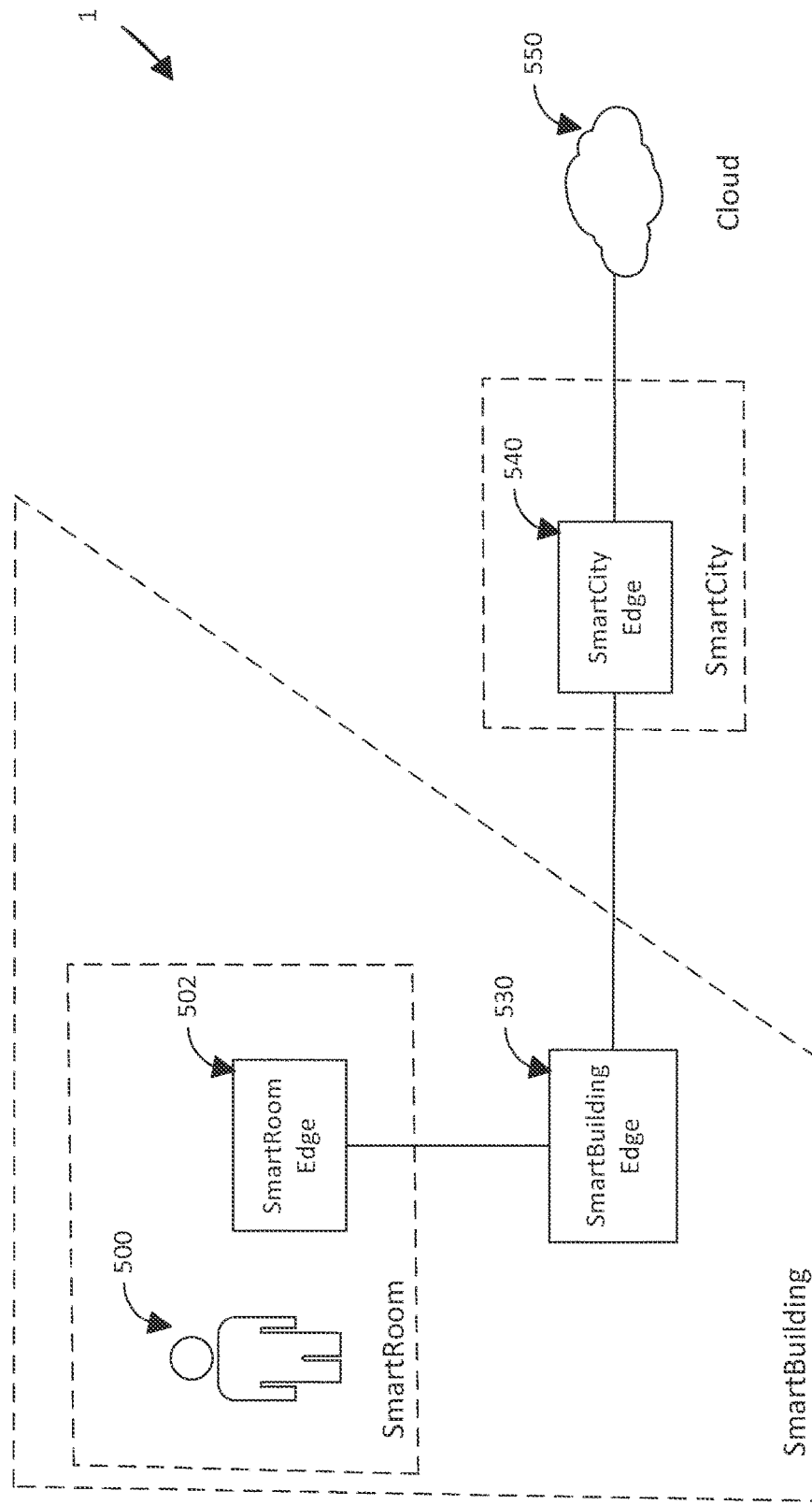
FIG. 5 depicts a deployed ecosystem of IoT devices in accordance with some embodiments of the present disclosure.

FIG. 5 depicts an optional configuration of the continuum 1 and its components in accordance with some embodiments of the present disclosure. FIG. 5 describes and shows the various computers and are labeled as "SmartRoom Edge" 502 (which might represent a "child computer"), a "SmartBuilding Edge" 530 (which might represent a "parent computer"), a "SmartCity Edge" 540 (which might represent a "grandparent computer"), and the Cloud 550 (which might represent a "great grandparent computer"). Although only one of each is shown, in the filled out ecosystem 1, there may be dozens, hundreds, or thousands (or more) of other computers represented by the single "SmartRoom Edge" computer 502, dozens, hundreds, or thousands (or more) of other computers represented by the "SmartBuilding Edge" 530, etc.

In an exemplary embodiment of the systems and methods related to temperatures, the types of activities and capabilities of the IoT system 1, and the possible workflow of the data requests that might be exchanged between the different computers.

Note that each depicted computer or node (e.g., with regard to FIG. 5, SmartRoom Edge 502, SmartBuilding Edge 530, SmartCity Edge 540, the Cloud 550, etc.) may be referred to herein individually as an "edge."

Activities of the IoT system 1 implemented by the edges can be defined as a set of application programming interfaces or "API's." This set may be referred to herein as a "schema." For temperature related operations, a schema of the system 1 can include APIs for activities such as requesting a room temperature, requesting a list of authorized room users, requesting a list of room owners, predicting the temperature based on a temperature history for the room, and predicting the room's temperature based on information from external data sources. The IoT system 1 thus may be configured to be capable of performing activities including but not limited to asking: 1) what is my temperature?; 2) who is allowed to read my temperature?; 3) who is allowed to set my temperature?; 4) what is my temperature likely to be based upon history?; and 5) what is my temperature likely to be based upon external factors?

Each edge can be aware of the API schema, but does not fully implement the APIs. To implement an API, the edge may need to have the full dataset or integrations necessary to fulfill the request. So, for example, a SmartRoom Edge 502 would need sufficient dataset or integrations to fulfill a request to implement the /getRoomTemperature API. SmartBuilding Edge 530 would need sufficient dataset or integrations to fulfill requests to implement the /getRoomUsers and /getRoomOwners APIs. SmartCity Edge 540 would need sufficient dataset or integrations to fulfill requests to implement the /predictTemperatureFromHistory API, and the Cloud 550 would need sufficient dataset or integrations to fulfill requests to implement the /predictTemperatureFromExternal API. Although each edge is aware of the API schema, each edge may not fully implement the APIs, and it is possible that an edge may not know which other edge implements an API or which APIs a particular edge can implement.

Each edge may have memory storage for storing data. In the context of implementing a schema for temperature activities, the information can include: temperature requests; users and owners of resources of any or various combinations of a SmartRoom or SmartBuilding or SmartCity; temperature history; and temperature information from external sources.

Figure 6:
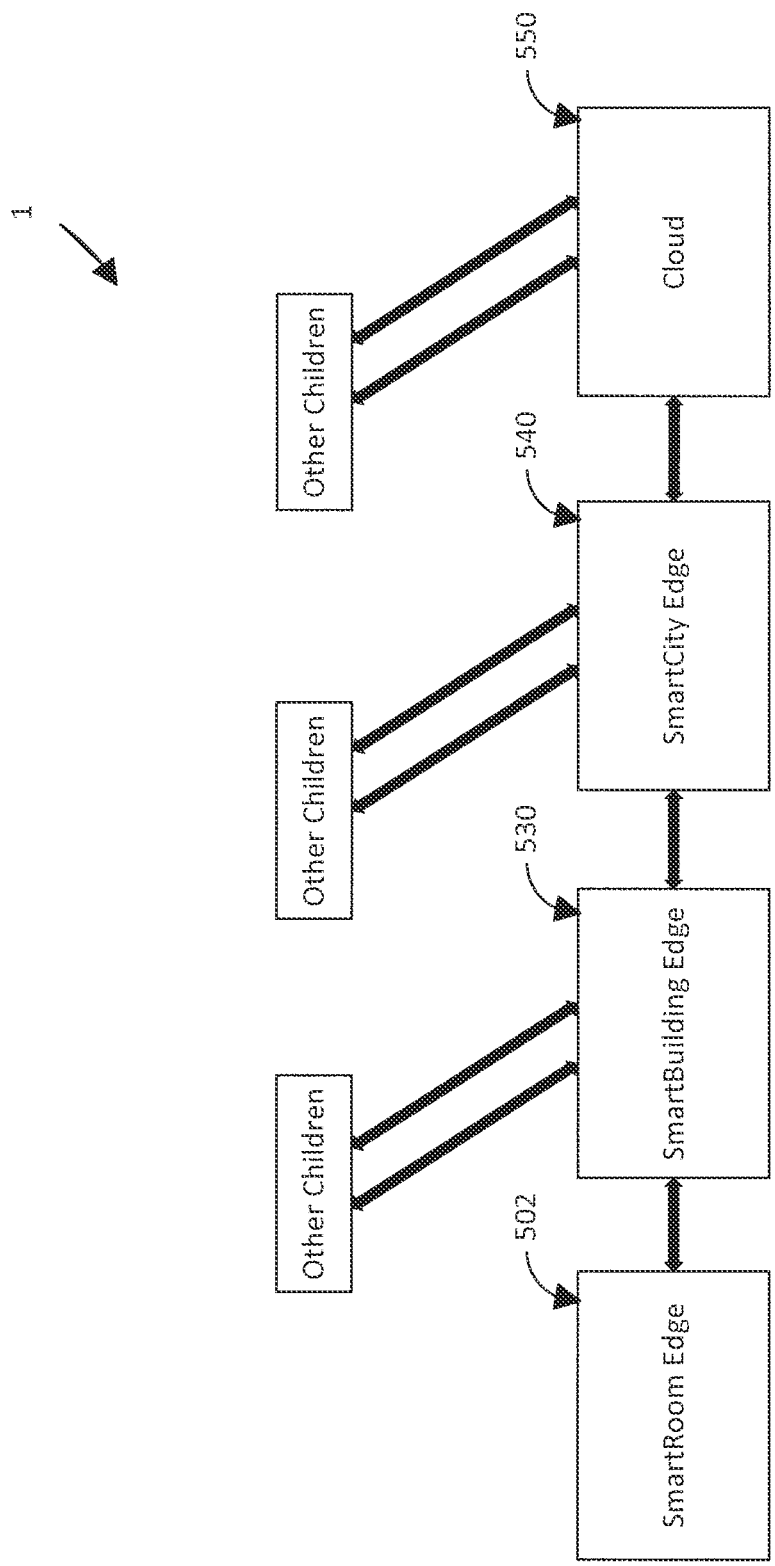
FIG. 6 depicts an exemplary deployed ecosystem of IoT devices in accordance with some embodiments of the present disclosure.

As illustrated by FIG. 6, each edge may generally have a parent/child relationship, although in one embodiment, each edge may have exactly one edge and 0 to many child edges. In addition, a connection between edges may be configured to have a bi-directional information flow. An edge can ask its parent and any children for an API request to be fulfilled, and the networked edge will then either answer the request or pass it along to its connections for fulfillment.

In a first exemplary operation of the embodiment of system 1 depicted in FIGS. 5 and 6, an edge may ask its parent for information. As an example, child 502 may ask parent 530 whether a user (e.g., user 500 who goes by "Jim") can read the temperature. The SmartBuilding Edge has a sufficient dataset or integrations to implement the /getRoomUsers API and can let the SmartRoom Edge child 502 know that Jim is not allowed to read the temperature.

In a second exemplary operation of the embodiment of system 1 depicted in FIGS. 5 and 6, an edge may ask its children and parent for information but only get one answer. As an example, SmartBuilding Edge 530 (parent) may ask SmartRoom Edge 502 (child) and SmartCity Edge 540 (grandparent) what the temperature is. The SmartCity Edge 540 may not have a sufficient dataset or integrations to implement the /getRoomTemperature API and fulfill the request, may ask its children and parent, and may tell the SmartBuilding Edge 530 that it does not know what the temperature is. However, the SmartRoom Edge 502 has a sufficient dataset or integrations to implement the /getRoomTemperature API and fulfill the request and can let the SmartBuilding Edge 530 know that the temperature is 78 degrees. The SmartBuilding Edge 530 only receives one answer (78 degrees).

In a third exemplary operation of the embodiment of system 1 depicted in FIGS. 5 and 6, an edge may ask its children and parent for information, and the edges must find the answer, but the edge only gets one answer. As an example, SmartBuilding Edge 530 (parent) may ask SmartRoom Edge 502 (child) and SmartCity Edge 540 (grandparent) what the temperature will be tomorrow. The SmartRoom Edge 502 may not have a sufficient dataset or integrations to implement the /predictTemperatureFromExternal API and fulfill the request, and may tell the SmartBuilding Edge 530 that it does not know what the temperature will be. The SmartCity Edge 540 also may not have a sufficient dataset or integrations to implement the /predictTemperatureFromExternal API and fulfill the request and determine what the temperature will be, and so may ask its children (other SmartBuilding Edges) and parent, the Cloud Edge 550 (great grandparent). The Cloud Edge 550 has a sufficient dataset or integrations to implement the /predictTemperatureFromExternal API and fulfill the request, and can let the SmartCity Edge 540 know that the temperature will be 44 degrees tomorrow. The SmartCity Edge 540 can then let SmartBuilding Edge 530 know that the temperature will be 44 degrees tomorrow. The SmartBuilding Edge 530 only receives one answer (44 degrees).

In a further example, an edge can be configured to filter messaging noise by examining messages that it receives and determining whether to forward them. If the edge determines that it has received essentially the same message previously, it can ignore the message and not forward it to its parent or children. However, when it receives a message updating a status of at least one previously received message (e.g., the message has not been received previously), the edge may forward the message to its parent or children. In this regard, the system 1 can preserve its ability to handle requests as close to the source of the request as possible without incurring delays from processing requests across multiple hops.

In some aspects, the domain model described in U.S. Pat. No. 9,038,015, can identify the different information providers, integration providers, and system behaviors of a particular application. This information can be used to define the API schema. As described in the appendix, while each computer in the hierarchy is aware of the API schema, each computer may not fully implement the API. In other words, a particular computer may not be able to answer any particular "question" (for example, who is allowed to set my temperature), but it knows whether that is a valid question that can be asked as configured by the domain model.

Figure 7:
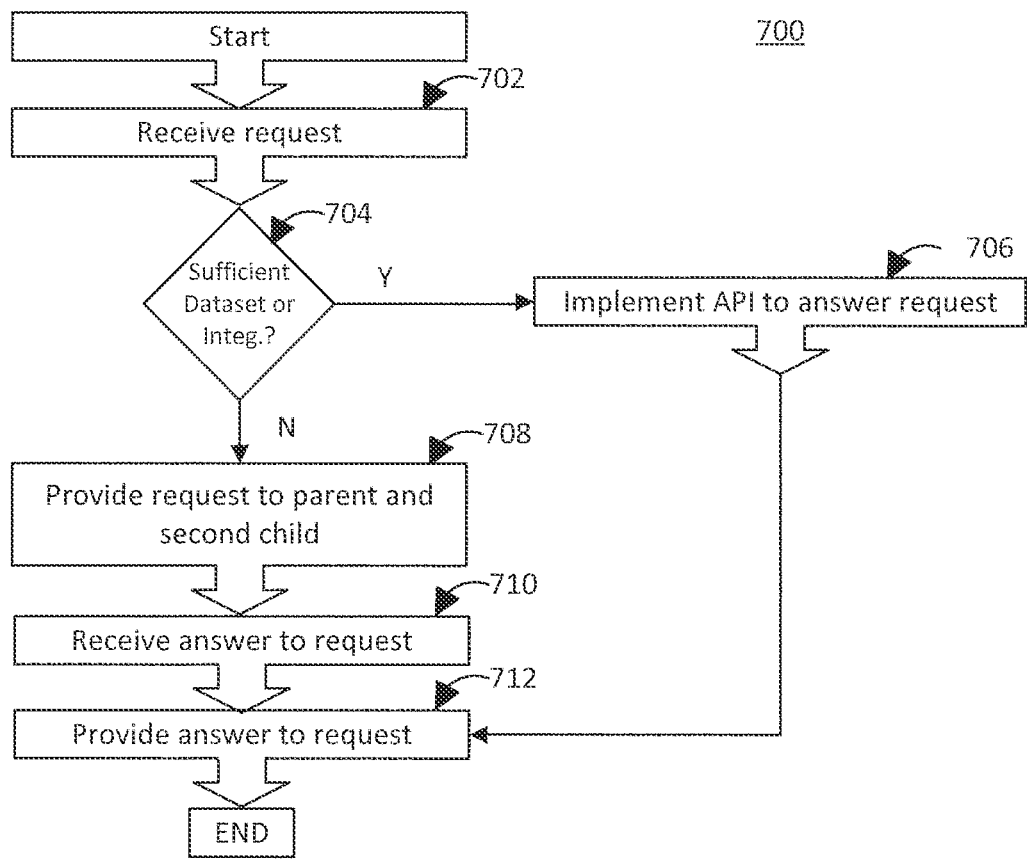
FIG. 7 a flowchart depicting an exemplary method for a deployed ecosystem of IoT devices in accordance with some embodiments of the present disclosure.

FIG. 7 depicts a data flow 700 in accordance with some embodiments of the present disclosure. At step 702, at a node configured to communicate with other nodes in an Internet of Things (IoT) hierarchy (e.g., SmartBuilding Edge 530) may receive a request from a first child node (e.g., SmartRoom Edge 502). As noted above, answering the request may require implementation of an API based on either a dataset or an integration stored in memory at SmartBuilding Edge 530. At step 704, the node may determine whether the node has ether the dataset or integration that is required to implement the API and answer the request.

If the node determines that it has either the dataset or integration, at step 706, the node may implement the API to answer the request, and processing may proceed to step 712 where the node may provide the answer to the request to the first child node. Thereafter, processing may end.

If the node determines that it does not have either the dataset or integration, at step 708, the node may provide the request for information to a parent node of the node (e.g., a grandparent, such as SmartCity Edge 540) and at least a second child node (e.g., a peer of SmartRoom Edge 502). Thereafter processing may continue to step 710, where the node may receive answer to the request from either the parent node (e.g., a grandparent, such as SmartCity Edge 540) or the at least second child node (e.g., a peer of SmartRoom Edge 502). Processing may then continue to step 712, where the node may provide the answer to the request to the first child node. Thereafter processing may end.

In some embodiments of the system 1 described above, system 1 may be configured to synchronize information across nodes 800 of the continuum 1 according to various exemplary techniques, as described in further detail below. "Node" may refer to one or more of device 3, child 2, parent 30, grandparent 40, or great grandparent 50, depending on the layer of the IoT system in which the respective device is located.

Figure 8:
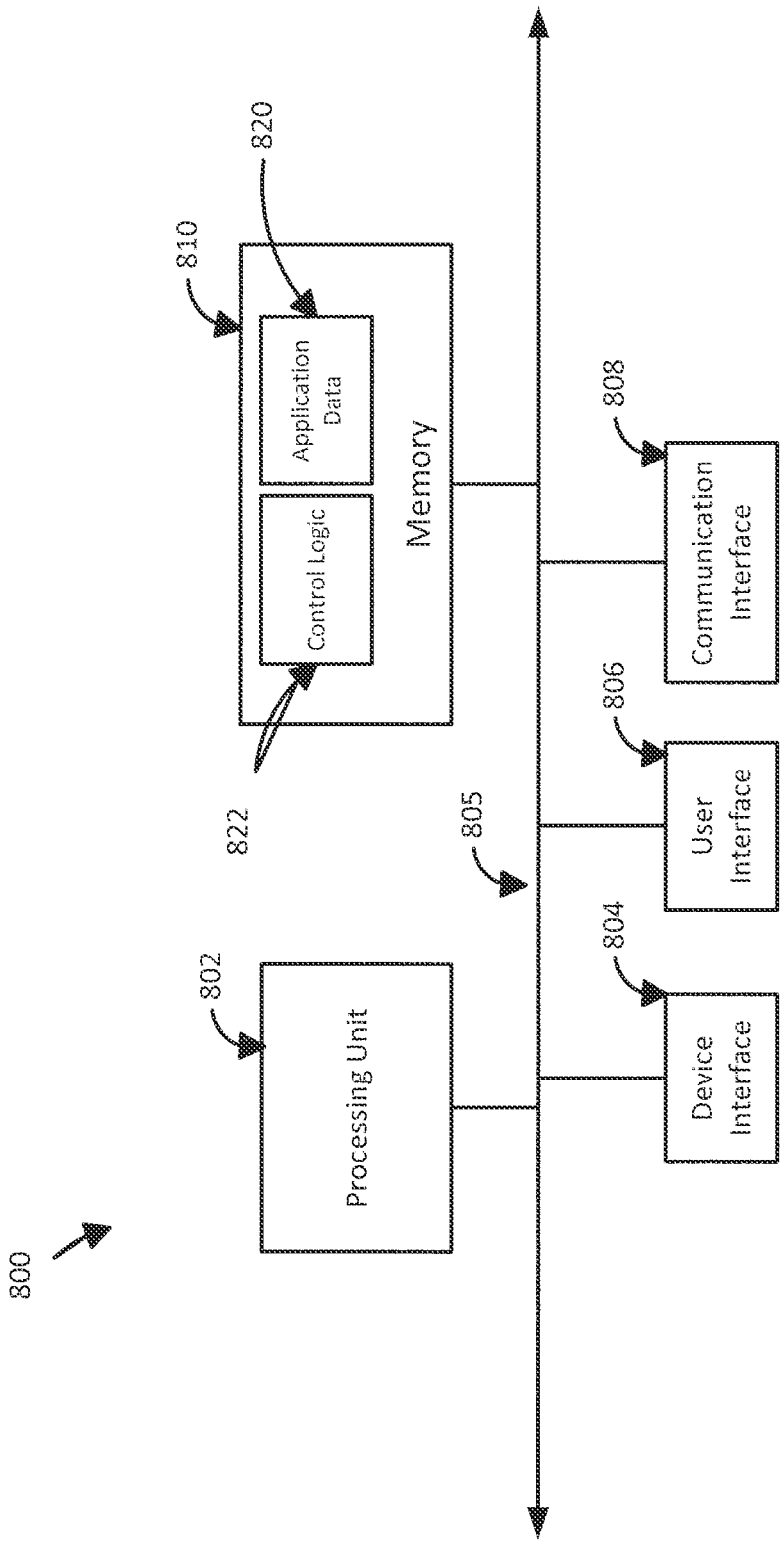
FIG. 8 a block diagram depicting an exemplary node of a deployed ecosystem of IoT devices in accordance with some embodiments of the present disclosure.

FIG. 8 shows an exemplary node 800 in accordance with some embodiments of the present disclosure. The exemplary node 800 of FIG. 8 includes a processing unit 802, device interface 804, a user interface 806, and communication interface 808, although other components are possible in other embodiments. The node 800 also includes at least one memory 810 which stores application data 820 and control logic 822. A node 800 may store other information and instructions in other embodiments. Although the node 800 is shown as having particular components and information, in some embodiments, a node 800 may include some, all or various combinations of the components of FIG. 8 or yet other components and information in order to achieve the functionality described herein. In some embodiments, the components of node 800 can vary based on the layer of the system 1 within which the node 800 is positioned. For example, a child node may have components configured to permit communication via one or more different communication protocols than those protocols a parent or grandparent node may be configured to communicate according to. The components of node 800 may be adapted in other ways to achieve the functionality ascribed to nodes of the system 1.

The exemplary node 800 depicted by FIG. 8 includes at least one conventional processing unit 802, which includes processing hardware for executing instructions stored in memory 810. The processing unit 802 may be various types of processor and may include various types of hardware, software, memory, and circuitry as is necessary to perform and control the functions of node 800. As an example, the processing unit 802 may include a central processing unit (CPU) or a digital signal processor (DSP). Processing unit 120 may include a number of processors, and may perform the operations of node 800 based on instructions in one or more memories and memory types, such as memory 810. As used herein, memory may refer to any suitable tangible or non-transitory storage medium. Examples of a tangible (or non-transitory) storage medium may include disks, thumb drives, and memory, etc., but does not include propagated signals. Tangible computer readable storage mediums may include volatile and non-volatile, removable and non-removable media, such as computer readable instructions, data structures, program modules or other data. Examples of such media may include RAM, ROM, EPROM, EEPROM, SRAM, flash memory, disks or optical storage, magnetic storage, or any other non-transitory medium that stores information that is accessed by a processor or computing device The processing unit 802 is configured to communicate with and drive the other elements within the controller 800 via a local interface 805, which can include at least one bus. In addition, the controller 800 can include various communications and output interfaces (e.g., screens, displays, etc.), which are not specifically shown in FIG. 8, but can be included to allow the node to perform functionality described herein. In some embodiments, the node 800 is coupled communicatively to one or more device interfaces 804, user interfaces 806 or communication interfaces 808, for example, via conductive means or via short-range communication protocol, such as Bluetooth®.

Although in some embodiments the processing unit 120 and memory 122 will be described implemented in a node 800 and configured in a particular manner, it will be understood that, in some embodiments, processing unit 802, memory 810, device interface 804, user interface 806 and communication interface 808 may be configured in any suitable manner to perform the functionality of the node 800 (or device 3, child 2, parent 30, grandparent 40, or great grandparent 50) as is described herein. It will also be understood that the functionality of node 800 may be embodied in a single device or a plurality of devices, each including one or more or various combinations of processing units and memory to collectively perform the functionalities of one or more nodes 800 as described herein.

Device interface 804 may comprise hardware, or various combinations thereof configured to communicate with various types of devices configured to capture desired information (e.g., one or more states of one or more physical devices, objects, systems, environments, etc.) and provide the information to the node 800. The device interface 804 may be associated with one or more devices that are associated with or which are themselves physical objects. Exemplary devices with which the device interface 804 may be compatible may include devices such as one or more sensors, cameras, switches, timers, counters, flow meters, thermometers, speed sensors, microphones, seismometers, acoustic sensors, gauges, optical sensors, spectrometers, displacement sensors, chemical sensors, electromagnetic sensors, electrical sensors, moisture sensors, proximity sensors, or other types of input devices. In some embodiments, the device interface 804 may comprise one or more of the foregoing devices, and may provide information captured by the device for use by the node 800. In addition, the device interface 804 may be configured to communicate information to and from the one or more devices may include communications protocols similar to those described with regard to the communications interface 808 below.

User interface 806 can include various combinations of hardware and software configured to implement a human-machine interface between a user and the node 800, such as by allowing a user to receive outputs from and provide inputs to the node. In some embodiments the user interface can include one or more or various combinations of a touchscreen, keyboard, mouse, physical input devices (e.g., buttons or switches), or otherwise.

Communication interface 808 may include one or more various combinations of hardware and software configured to communicate with other nodes of the system 1. The communication may be via one or more various communication protocols, such as wireless communication protocols like Bluetooth®, RF communication, NFC communication or otherwise. It will be understood that the functionality ascribed to the node 800 and components of system 1 is not necessarily dependent upon communication via a particular protocol, and other communication techniques and interfaces are possible in other embodiments. In this regard, the node 800 may include one or more communication interfaces 808 that will allow for communications via desired communication protocols to facilitate synchronization between edges (e.g., children) and cloud (e.g., great grandparent), and can vary based on which layer of the system the node 800 is positioned within. Example communications protocols and techniques may include, but are not limited to the Internet, TCIP/IP, ETP/IP, Pub/Sub Messaging (e.g., MQ Telemetry Transport ("MQTT"), Advanced Message Queuing Protocol ("AMQP")), Request/Response model (e.g., Reference Transactions API, Customer Information Control System ("CICS") transactions), modular open radio frequency architecture ("MORA"). Payload may be formatted or defined as XML, JSON, machine code, bytecode, binary or hexadecimal code, or otherwise.

Application data 820 may include various types of data that a node 800 may require in order to carry out operations of the system 1 and one or more applications running on the node (e.g., as implemented in and carried out by control logic 822), and may include data related to the state of the node, information from one or more application developers, integration providers, messaging providers or otherwise. Formatting of data stored in application data 820 may be proprietary, open standard, etc. The application data 820 can include a plurality of each of state tables, state data, state update data, node maps with addresses, links, and identifiers of parent nodes and children nodes, etc. The state data can include data indicative of a current state or desired state of the node 800 (e.g., state of one or more physical devices associated with the node 800) or similar information for one or more other nodes of the system 1. The state update data can include data indicative of one or more states of the node 800 which may be provided as an update to other nodes of the system 1. In some embodiments, the application data 820 can include a partial or total history of data stored by the node 800, including historical data of states of one or more devices associated with the node 800 (e.g., when connectivity with one or more other nodes is lost). Retention and storage of historical data in application data 820 may be managed by control logic 822.

As an example of types of node states that may be included in application data 820, where the node is configured to measure information about railroad crossings (e.g., nodes 900 and 902 of FIG. 10), the application data can include various information about the number of times a crossing arm (e.g., crossing arms 898, 899) associated with the node was actuated (e.g., moved up and down) and for how long, whether lights of the crossing arm were actuated and for how long, an amount of time required for the crossing arm to lower and raise, whether any anomalies were experienced, identifiers of trains or vehicles that passed the particular crossing arm, dates and times of day, location of the crossing arm, whether another crossing arm associated with the same crossing has been or is performing properly, etc. Other information related to the crossing arms may be included in other embodiments.

As an additional example, the data 820 can include data related to temperature of a room in a building that is monitored and potentially controlled as part of a SmartCity (e.g., using SmartRoom Edge 502, SmartBuilding Edge 530, SmartCity Edge 540 and Cloud 550 of FIG. 5). The data 820 can include numerical temperature values, associated time and location information, information about user access and interactions, or otherwise.

As noted above, references herein to functionality ascribed to one or more components of system 1, such as edges, nodes, device 3, child 2, parent 30, grandparent 40, great grandparent 50, or other devices. may be performed by one or more nodes 800. In some embodiments, the control logic 822 of node 800 may be configured to allow the node 800 carry out such operations. In some embodiments, the control logic 822 may be configured to implement an operational platform similar to that described in U.S. Pat. No. 9,038,015, which is incorporated herein by reference in its entirety. Logic 822 may be configured to perform other functionality in other embodiments.

In this regard, although particular examples of node functionality may be described with reference to node 800, in some embodiments, node 800 (e.g., logic 822) can be configured to perform essentially any of the functionality ascribed herein to one or more of the device 3, child 2, parent 30, grandparent 40, or great grandparent 50. Similarly, in some embodiments, one or more of the device 3, child 2, parent 30, grandparent 40, or great grandparent 50 may be configured to perform some or all of the functionality ascribed to the node 800 (e.g., control logic 822). In the context of this document, the terms "logic," "control logic," or "node logic" may refer to hardware logic, computer readable instructions running on a processor, or various combinations thereof. The logic 822 may be configured to implement desired functionality of a particular node or various combinations of such functionality and used to control operation of one or more nodes of the system 1.

The control logic 822 may include instructions for controlling various operations of the node 800, such as internal communications, power management, processing of messages, systems monitoring, device interface and user interface control, operation of communication interface 808, and the management of other sets of instructions. In one embodiment, the logic 822 may provide an operating system and applications necessary to perform various processing operations that are performed by the processing unit 802 and ascribed to the node 800, logic 822, or various combinations thereof.

The logic 822 also may enable the node 800 to run developer applications (e.g., "business logic") for carrying out various desired operations, including but not limited to the examples described herein. Such applications may be developed and operated via an operational platform of the system 1 or other similar location. Updates may periodically be provided to reachable nodes of the system 1 when available.

The logic 822 may comprise one or more portions of node update logic received from time to time at the node, such as when a developer issues an update or when the system 1 synchronizes logic updates across nodes of the system 1. In some embodiments, a user may modify a setting of the node (e.g., node logic 822) via user interface 806 which may alter functionality of the device and node. In some embodiments, the logic 822 may be configured to receive and install the portions of the node update logic to update the logic 822. In some embodiments, the logic 822 may receive node update logic (e.g., from a parent or child node), determine a first portion of the node update logic to install at the node 800, and then install the first portion of the node update logic at the node. Additional portions of the node update logic may be installed subsequently, if desired. Further, control logic 822 may be configured to modify, remove or replace portions of logic updated by the one or more portions of node update logic.

The logic 822 may be configured to take various actions to install node update logic received at the node 800. The logic 822 may cause the node 800 to shut down, restart, run a power cycle, disconnect from communication with the system 1 or otherwise as part of installing one or more portions of node update logic. In addition, when a node 800 starts up initially (e.g., is powered on or booted as part of a restart) the logic 822 may be configured to receive desired application logic (e.g., from the cloud or otherwise where development and deployment is handled) as an initial part of the synchronization process described herein. One or more developers of the logic 822 for the node may decide whether to optimize synchronization, and may specify various information regarding one or more applications running on nodes of the system, such as: what business logic belongs in which nodes of the system 1, what data and node update logic should be synchronized and what should not, and what synchronization should be optimized, and what should not. When ready, the application (e.g., portions of node update logic) may be distributed to the nodes via one or more deployments which may specify such information as which nodes should receive particular logic, what information is synchronized, what is not synchronized, what synchronization is optimized, and what synchronization is not optimized. Such information can be revised as desired by one or more users or developers in communication with the node. Once the logic 822 has installed a first portion of node update logic, additional portions of node update logic may be installed subsequently by repeating all or some of the same steps as described above for installing the first portion of node update logic.

In some embodiments, the logic 822 can be configured to receive state data from a parent or child node of the node 800 and to generate one or more state updates based on the state data from application data 820. The state updates generated by the control logic 822 can be stored in application data 820. The logic 822 can generate subsequent state updates based on subsequently received state data and store such subsequent updates in memory in application data 820.

The logic 822 further can be configured to determine that at least one additional node that should receive the one or more state updates and identify the at least one additional node that should receive the one or more state updates based on the determination. The at least one additional node may include a parent node of the node 800, a second child node of the node 800, or other nodes of the system 1 (e.g., peer nodes, the cloud, etc.). In some embodiments, the logic 822 may be configured to identify the at least one additional node based on various information consistent with the synchronization techniques described herein. For example, the identification may be based on a determination that one or more additional nodes should have information included in the one or more state updates in order to facilitate desired operation of the one or more additional nodes and the system 1. This may occur, for example, when the one or more state updates comprises information indicative of the current state of the node 800, such as digital twin data. The logic 822 may determine that such information should be provided to the one or more additional nodes that need the current state of the node 800, identify the nodes, and provide the state update to the one or more additional nodes.

In other instances, such as when connectivity with one or more other nodes (e.g., a parent node or one or more children of the node 800) has been lost, the logic 822 may determine that the one or more state updates should not be provided. Instead, the logic 822 may continue to receive state updates, store them, wait until a connection is reestablished and then select the appropriate one or more state updates to provide. In some embodiments, the appropriate state updates may be the latest state update generated or one or more state updates generated based on the latest state data received. In some embodiments, a determination of the appropriate state updates may be based on state data received at desired intervals or otherwise. In some embodiments, the one or more state updates may be generated based on one or more optimization rules, such as which state updates to select and provide (e.g., of node logic 822 or of portions of the node update logic). The rules may be based on the particular application desired for the device with which the node is associated (e.g., collecting and storing historical data if interest lies in events like temperature readings over time to determine average temperature, but discarding historical data if interest lies in events like temperature changes with respect to a threshold). Note also that such optimizations may be toggled on, off, or modified as desired. Unused or unsent state updates and state data may be stored in application data 820 if desired (e.g., as historical data), so that only the desired state data is provided from the node 800. When one or more state updates are provided, such state updates may be propagated throughout the system 1. The propagation may be performed by providing the one or more state updates to one or more parents and children of the node 800, which may forward the updates on to one or more additional parents and children. The logic 822 may repeat the above process as desired based on additional state data received at the node 800 or application functionality in node logic 822.

In some embodiments, the logic 822 can be configured to receive one or more portions of node update logic from a parent or child node of the node 800 and to install the one or more of the portions of node update logic. As described above, the one or more portions of update logic received at node 800 may update logic 822.

In some embodiments, one or more portions of node update logic may be provided from node 800 to a parent of the node 800, which may be propagated to other nodes of the system 1 and the cloud. This may occur for example, when a developer or user makes a change to a particular application that is specified to be synchronized to one or more nodes of the system 1. An example of this functionality may be seen in the context of a code service, but other instances of generation and synchronization of application updates provided as portions of node update logic are possible in some embodiments.

In some embodiments, a user may determine that one or more devices associated with the node are not functioning as desired and generate one or more portions of node update logic to update the logic 822 and provide the node update logic to the node 800. Exemplary modifications may include adjustments to various functionality of devices that may be controlled by node 800, such as reducing timer intervals for a timer that runs too often. A user (or algorithm) may modify a setting of the node via user interface 806 or developer may generate a portion of node update logic to reduce the interval at which the timer runs to the desired interval and may provide the update to the system 1, which may propagate the portion of node update logic to the node 800. Such modifications to the logic 822 may include practically any suitable modifications to logic 822 implemented at node 800 to achieve the desired functionality of the nodes and associated devices. Various other applications will be apparent to one of ordinary skill upon a reading of this disclosure.

The logic 822 further can be configured to determine that at least one additional node that should receive the one or more portions of node update logic and identify the at least one additional node that should receive the one or more portions of node update logic. The at least one additional node may include a parent node of the node 800, a second child node of the node 800, or other nodes of the system 1 (e.g., peer nodes, the cloud, etc.). In some embodiments, the logic 822 may be configured to identify the at least one additional node based on various information consistent with the synchronization techniques described herein. For example, the identification may be based on a determination that one or more additional nodes should receive the one or more portions of node update logic in order to facilitate desired operation of the one or more additional nodes and the system 1.

In addition, portions of node update logic can be configured to modify or update logic 822 that informs the determination that particular update logic should be provided to one or more additional nodes of the system 1 as one or more state updates. For example, a node 800 that includes logic 822 configured to implement an application requiring information regarding the current state of node 800 (e.g., a security program) may be re-associated with a device that requires additional information besides just current state (e.g., a summary of temperature measurements over time). One or more node logic updates may be issued to the node 800 to update logic 822 so that it provides the appropriate information.

In other instances, such as when connectivity with one or more other nodes (e.g., a parent node or one or more children of the node 800) has been lost, the logic 822 may determine that the one or more portions of node update logic should not be provided. Instead, the logic 822 may wait until a connection is reestablished and then select the appropriate one or more portions of node update logic to provide, such as based on the most current information available. In some embodiments, the appropriate one or more portions of node update logic may be identified based on a latest update received for a particular portion of control logic 822.

In some embodiments, an identification of appropriate portions of node update logic to receive and install may be based on desired functionality of one or more devices associated with node 800. In some embodiments, the one or more portions of node update logic may be generated based on one or more optimization rules (e.g., of node logic 822 or of the node update logic). Unused portions of node update logic may be stored in application data 820 if desired (e.g., as historical data) or discarded, so that only the desired node update logic portions are kept and installed. When one or more portions of node update logic are provided that should be propagated to other nodes, such updates may be propagated throughout the system 1. The propagation may be performed by providing the one or more node update logic portions to parents and children of the node 800, which may forward the portions of node update logic on to additional parents and children. The logic 822 may repeat the above process as desired based on additional node logic update portions received at the node 800 or desired functionality of node logic 822.

In some distributed networks, it may be difficult to maintain an accurate representation for interested stakeholders of a current state of an object associated with a node of the system. For example, whether a door is in an open or closed state might be interesting to a business security manager who is responsible for keeping the business secure. The door's current state may be interesting to a facilities manager, who may be interested in preventing a heating or cooling leak and associated energy loss. Law enforcement may be interested in preventing theft, and may want to know whether a door is left open. Other examples of stakeholders interested in a door's status are possible.

In order to determine the current state of the door, some systems may require nodes to poll a node associated with the door for its current state. Some systems may require the node associated with the door to periodically broadcast the door's state to the system, which must transmit the state to a stakeholder via the system an synchronize the information to their appropriate location. This propagation may require substantial resources, and may lead to inefficiencies, redundancy, decreased communications speed, and increased error rates.

In some embodiments, nodes of the system may be configured to implement the synchronization techniques described herein to reduce such problems by generating and maintaining one or more "digital twins" of one or more states of one or more devices associated with the node and propagating the twin across the system 1. The term "digital twin" may refer to a digital representation mirroring one or more states (e.g., a data or logic state) of the one or physical objects and associated nodes. The generation of the digital representation may be based on information received at a node, such as from one or more of the device interface, user interface, information stored in application data, or otherwise, and may be stored in memory (e.g., as application data). Information in the digital twin may be synchronized across the system along with other information according to the techniques described herein. In this regard, the system may reduce traffic of the system and resolve the need for error-prone, redundant and inefficient polling by other nodes of the system.

Figure 9:
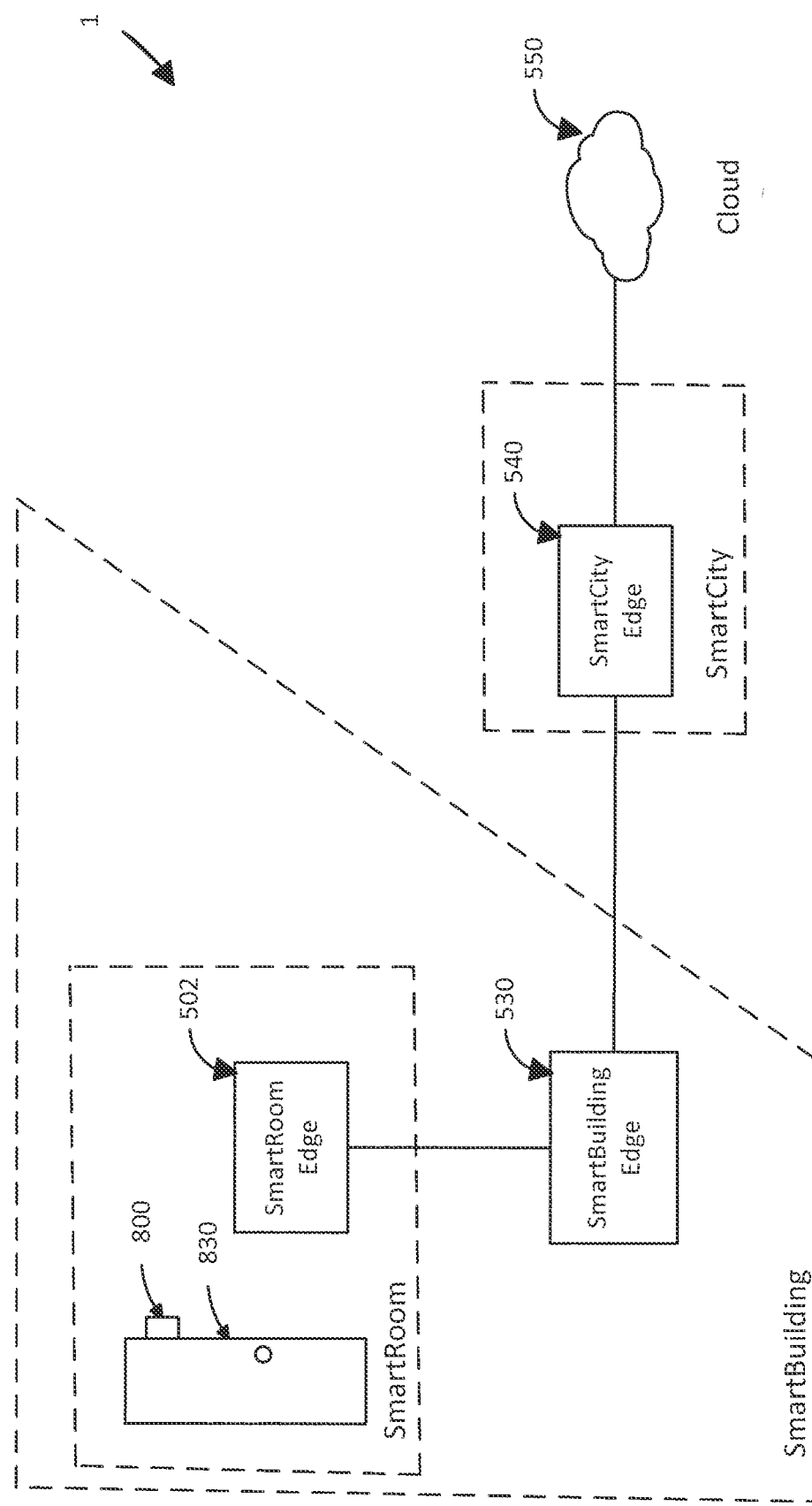
FIG. 9 depicts a deployed ecosystem of IoT devices for a door of a building in accordance with some embodiments of the present disclosure.

An exemplary implementation of the system 1 configured to perform such functionality is shown in FIG. 9. FIG. 9 shows an exemplary node 800 configured to generate and maintain one or more digital twins of one or more states of the node or devices associated with the node (e.g., device interface 804). In FIG. 9, the node 800 is associated with a door 830.

In this regard, the logic 822 may be configured to generate one or more digital twins of the state data for the door 830, which may have two total states: open and closed. The logic 822 may generate note the total number of states associated with the physical object for which the digital twin is being generated and may generate the digital twin having a corresponding number of states. The logic 822 may monitor whether the door is open or closed (e.g., via device interface 804). The logic 822 may periodically note the current state of the door 830 (e.g., "open" or "closed"), and may update the information stored in the digital twin as needed (e.g., when the state of the door 830 changes). The logic 822 may be configured to distribute information related to a current state of the digital twin to other locations (e.g., nodes) of the system 1 so that the current state data for the door 830 may be available for use by one or more other nodes of the system 1.

The logic 822 similarly may be configured to generate one or more digital twins of components of logic of the node or devices associated with the node, such as logic 822, firmware of the device or otherwise. The logic 822 may store information related to such logic and relevant to determining whether an update is required, such as version numbers, update times, etc. Digital twins may be generated to mirror other information in some embodiments.

Figure 10:
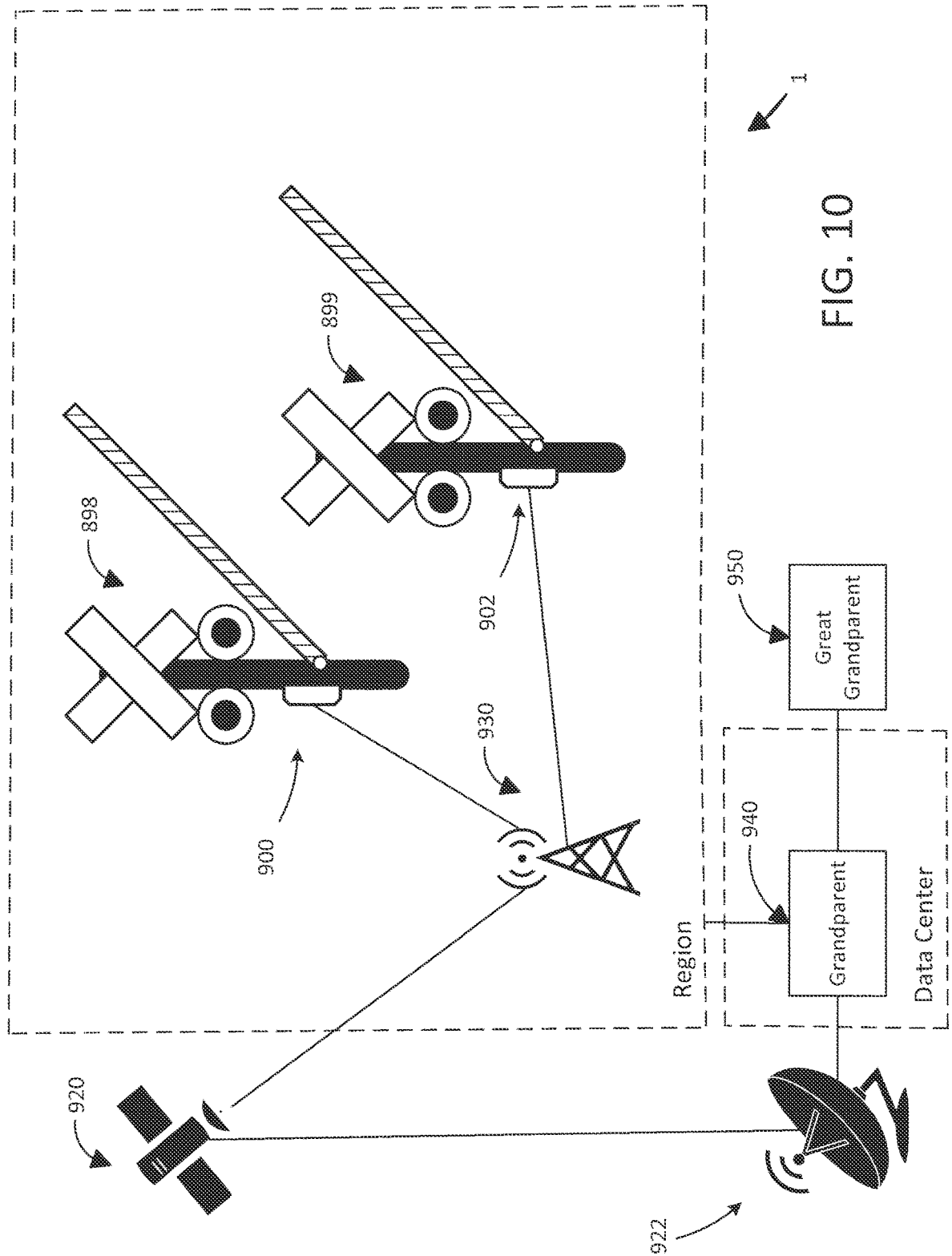
FIG. 10 depicts a deployed ecosystem of IoT devices for monitoring railroad crossings in accordance with some embodiments of the present disclosure.

Note that similar techniques for asset synchronization may be performed across various IoT networks, including the networks described with regard to the illustrative example network shown in FIG. 10.

FIG. 10 depicts a deployed ecosystem of IoT devices for monitoring railroad crossings in accordance with some embodiments of the present disclosure. The system 1 of FIG. 10 includes two railroad crossing arms 898 and 899. Two nodes 900 and 902 are shown, each associated with respective arms 898 and 899. The nodes 900 and 902 are in communication with at least one communication site 930 in the region, which can be configured to communicate with the nodes 900 and 902 wirelessly or otherwise as described herein. An exemplary satellite 920 and communications station 922 are depicted in the embodiment of FIG. 10 for receiving information from the tower 930 and relaying such information to other nodes of the network and the data center, but in some embodiments, information may be relayed back to data center and grandparent 940 via other communicative configurations and systems. The system 1 further include great grandparent 950, which may be the cloud or other platform. Any of the components of FIG. 10 can be configured to operate similarly to those described with regard to various other embodiments described herein.

Nodes 900 and 902 may include control logic (e.g., logic 822, not specifically pictured in FIG. 10) which may be configured to raise and lower when a train comes. A developer of the application for controlling the railroad arms 898 and 899 may want to gather various information, such as metrics and other information regarding whether the arms 898 and 899 are functioning properly, whether the arms are up or down, whether there were any failures or malfunctions detected by the nodes 900 and 902, whether the arms 898 and 899 were tampered with, remaining life of the components of the arms 898 and 899, etc.

In some embodiments, state changes for components of the railroad crossing arms 898 and 899 may be sent back to grandparent 940 and great grandparent 950 in order to permit users to monitor performance of the arms 898 and 899. In an illustrative example, a user may determine that some aspect of performance or functionality of the arms 898 and 899 should change, such as based on information stating that, for example, one or both of arms 898 and 899 is lowering too frequently or other malfunction. The user may generate and provide one or more portions of node update logic to the nodes 900 and 902 as appropriate to adjust the functionality of the arms by reducing frequency at which the arm lowers or by tying lowering of the faulty arm to lowering of a properly functioning arm associated with the same intersection (which should lower at the same time as the affected arm).

In some embodiments, communication site 930 may receive the one or more portions of node update logic and may determine that the node update logic should be provided to the node 900, 902 of the affected arm 898 and 899. If the communications site 930 is in communication with the appropriate node 900, 902, the site 930 may determine whether to provide the one or more portions of the node update logic, such as based on control logic of the site 930, available state data from the respective node 900, 902 or combinations thereof. Based on the determination, the site 930 may provide the one or more portions of the node update logic to the node 900, 902 if the site 930 determines one or more portions of the node update logic should be provided. However, if the site 930 is not in communication with the appropriate node 900 or 902 or the site 930 determines that it should not provide the one or more portions of the node update logic, the site 930 may wait until a determination is made either that communication has been restored with the appropriate node 900, 902 or that the one or more portions of the node update logic should be provided for other reasons.

In some embodiments, once the nodes 900, 902 have received and determined whether to update their control logic with the one or more portions of the node update logic, a notification may be provided to the developer (e.g., via site 930, satellite 920, and station 922 back to the data center and grandparent 940 or great grandparent 950) that the one or more portions of the node update logic have been installed to update the logic of the affected node 900, 902.

Further examples of embodiments in which the asset synchronization functionality of system 1 may be possible are described below.

In an example in the context of manufacturing environment and providing functionality to an edge via node update logic based on state updates, the system 1 may be implemented in a factory, wherein one or more child nodes may be associated with a factory machine or worker on the plant floor. The one or more child nodes may provide sensor data and error rates to a parent node (e.g., of a room or building housing the machines). The parent node may receive the sensor data and error rates from the child edge node, and synchronize such information back to the platform (e.g., great grandparent) where one or more algorithms (e.g., artificial intelligence, neural networks, machine learning, etc.) may be trained using the data. Such models may then be synchronized back down to the edges (e.g., as one or more portions of node update logic provided to the one or more child nodes associated with the factory machine). The edge may then "test" these models to predict failure of the machine. The edge also may monitor location and entry or exit of a secured area by the worker. These concepts can be applied using other information provided to generate one or more portions of node update logic which have different functionality.

Another example is provided by some embodiments in which a drone or other unmanned vehicle is traveling around a city. In some embodiments, the vehicle may include a node configured to gathering video and audio data (e.g., state data). As the vehicle moves from street block to street block it may connect communicatively to a nearby edge node associated with a building. The node of the vehicle may send its data to the nearby building edge where the nearby edge may begin processing the vehicle data and building an overall context and understanding of the data (e.g., using algorithms, models, or other sequences implemented in its control logic). The nearby edge may then synchronize its current vehicle context of understanding to the platform. Subsequently, the vehicle may physically move into another area, where it may connect to another, closer edge. The platform may synchronize the context to the closer edge and the closer edge may continue processing data for the vehicle.

An additional example illustration of the system's synchronization techniques and the control logic 822 may be explained with reference to a system configured similarly to the system 1 shown by FIG. 6, in which each of SmartRoom Edge 502 (child node), SmartBuilding Edge 530 (parent node) and SmartCity Edge 540 (grandparent node) and Cloud 550 (great grandparent node) may be configured to implement node functionality similar to that of the node 800 of FIG. 8. The nodes of FIG. 6 are depicted in the context of "Smart" building implementation, but it will be understood that the functionality described herein for synchronizing information across the nodes may be applied in various other situations in which the system 1 is implemented besides the specific embodiment of FIG. 6.

Node 530 may be configured to receive first state data from child node 502 of the node 530 and generate a first state update based on the first state data. The node 530 may identify at least one additional node (e.g., at least a parent node 540 of the node or a second child node of the node 530) that should receive the first state update. In some embodiments, the at least one additional node may be identified based a determination that the first state update should be provided, as described above. The node 530 may then provide the first state update to the at least one additional node that should receive the first state update.

In some embodiments, the node 800 may further be configured to receive node update logic from a parent node of node 800. The node update logic may be configured to update the node logic 822, and the node 530 may update the node logic based on the node update logic. The node 530 may receive second state data from the child node and may generate a second state update based on the second state data. Thereafter, the node 530 may identify at least one additional node that should receive the second state update, such as based a determination that the second state update should be provided. The node 530 may provide the second state update to the at least one additional node that should receive the second state update.

In some embodiments, the node 530 may be further configured to receive third state data from the child node and establish that the node 530 is unable to communicate with its parent node. The node 530 may receive fourth state data from the child node and may generate a third state update, and the third state update may be based on a determination either that only the fourth state data should be provided or that both the third state data and fourth state data should be provided. The node 530 also may be configured to establish that the node 530 is able to communicate with the parent node and providing the third state update.

Further, in some embodiments, generating the third state update may be based on an optimization rule of the node update logic. In some embodiments, node update logic may be received based on at least the first state data. In some embodiments, updating the node logic comprises restarting the node.

It will be understood that other applications of the techniques described herein using IoT architecture may be possible in other embodiments. In this regard, the logic 822 may be configured perform synchronization using one or more or various combinations of the techniques described herein.

The foregoing description illustrates and describes the processes, machines, manufactures, compositions of matter, and other teachings of the present disclosure. Additionally, the disclosure shows and describes only certain embodiments of the processes, machines, manufactures, compositions of matter, and other teachings disclosed, but, as mentioned above, it is to be understood that the teachings of the present disclosure are capable of use in various other combinations, modifications, and environments and is capable of changes or modifications within the scope of the teachings as expressed herein, commensurate with the skill and/or knowledge of a person having ordinary skill in the relevant art. The embodiments described hereinabove are further intended to explain certain best modes known of practicing the processes, machines, manufactures, compositions of matter, and other teachings of the present disclosure and to enable others skilled in the art to utilize the teachings of the present disclosure in such, or other, embodiments and with the various modifications required by the particular applications or uses. Accordingly, the processes, machines, manufactures, compositions of matter, and other teachings of the present disclosure are not intended to limit the exact embodiments and examples disclosed herein. Any section headings herein are provided only for consistency with the suggestions of 37 C.F.R. § 1.77 or otherwise to provide organizational queues. These headings shall not limit or characterize the invention(s) set forth herein.

What is claimed is:

1. A method of synchronizing information across nodes in an Internet of Things (IoT) hierarchy, comprising:
   receiving, at a node configured to execute node logic and to communicate with other nodes in the IoT hierarchy, first state data from a child node of the node;
   generating a first state update based on the first state data;
   identifying, at the node, at least one additional node that should receive the first state update, wherein the at least one additional node comprises at least a parent node of the node or a second child node of the node, and wherein the identifying at least one additional node is based on a determination that the first state update should be provided;
   providing, from the node, the first state update to the at least one additional node that should receive the first state update;
   receiving, at the node, node update logic from the parent node, wherein the node update logic is configured to update the node logic;
   updating, at the node, the node logic based on the node update logic;
   receiving, at the node, second state data from the child node;
   generating, at the node, a second state update based on the second state data;
   identifying, at the node, at least one additional node that should receive the second state update, wherein the identifying at least one additional node that should receive the second state update is based a determination that the second state update should be provided; and
   providing, from the node, the second state update to the at least one additional node that should receive the second state update.

2. The method of claim 1, further comprising:
   receiving, at the node, third state data from the child node;
   establishing, at the node, that the node is unable to communicate with the parent node; and
   receiving, at the node, fourth state data from the child node;
   generating, at the node, a third state update, wherein the third state update is based on the determining either that only the fourth state data should be provided or that both the third state data and fourth state data should be provided.

3. The method of claim 2, further comprising:
   establishing, at the node, that the node is able to communicate with the parent node; and
   providing, from the node, the third state update.

4. The method of claim 2, wherein the generating the third state update is based on an optimization rule of the node update logic.

5. The method of claim 1, wherein the node update logic is received based on at least the first state data.

6. The method of claim 1, wherein the updating the node logic comprises restarting the node.

7. A method of synchronizing information across nodes in an Internet of Things (IoT) hierarchy, comprising:
   receiving, at a node configured to execute node logic and to communicate with other nodes in the IoT hierarchy, first state data from a child node of the node;
   generating a first state update based on the first state data;
   identifying, at the node, at least one additional node that should receive the first state update, wherein the at least one additional node comprises at least a parent node of the node or a second child node of the node, and wherein the identifying at least one additional node is based on a determination that the first state update should be provided; and
   providing, from the node, the first state update to the at least one additional node that should receive the first state update.

8. The method of claim 7, further comprising:
receiving, at the node, node update logic from the parent node, wherein the node update logic is configured to update the node logic;
updating, at the node, the node logic based on the node update logic;
receiving, at the node, second state data from the child node;
generating, at the node, a second state update based on the second state data;
identifying, at the node, at least one additional node that should receive the second state update, wherein the identifying at least one additional node that should receive the second state update is based a determination that the second state update should be provided; and
providing, from the node, the second state update to the at least one additional node that should receive the second state update.

9. The method of claim 7, further comprising:
receiving, at the node, third state data from the child node;
establishing, at the node, that the node is unable to communicate with the parent node; and
receiving, at the node, fourth state data from the child node; and
generating, at the node, a third state update, wherein the third state update is based on the determining either that only the fourth state data should be provided or that both the third state data and fourth state data should be provided.

10. The method of claim 9, further comprising:
establishing, at the node, that the node is able to communicate with the parent node; and
providing, from the node, the third state update.

11. The method of claim 9, wherein the generating the third state update is based on an optimization rule of the node update logic.

12. The method of claim 7, wherein the node update logic is received based on at least the first state data.

13. The method of claim 7, wherein the updating the node logic comprises restarting the node.

14. A node of an Internet of Things (IoT) network, comprising:
a communication interface;
a processing unit configured to execute node logic to:
receive first state data from a child node of the node;
generate a first state update based on the first state data;
identify at least one additional node that should receive the first state update,
wherein the at least one additional node comprises at least a parent node of the node or a second child node of the node, and
wherein at least one additional node is identified based on a determination that the first state update should be provided; and
provide the first state update to the at least one additional node that should receive the first state update.

15. The node of claim 14, wherein the processing unit is further configured to execute node logic to:
receive node update logic from the parent node, wherein the node update logic is configured to update the node logic;
update the node logic based on the node update logic;
receive second state data from the child node;
generate a second state update based on the second state data;
identify at least one additional node that should receive the second state update, wherein the at least one additional node that should receive the second state update is identified based on a determination that the second state update should be provided; and
provide the second state update to the at least one additional node that should receive the second state update.

16. The node of claim 14, wherein the processing unit is further configured to execute node logic to:
receive third state data from the child node;
establish that the node is unable to communicate with the parent node;
receive fourth state data from the child node; and
generate a third state update, wherein the third state update is based on a determination either that only the fourth state data should be provided or that both the third state data and fourth state data should be provided.

17. The node of claim 16, wherein the processing unit is further configured to execute node logic to:
establish that the node is able to communicate with the parent node; and
provide the third state update.

18. The node of claim 16, wherein the third state update is generated based on an optimization rule of the node update logic.

19. The node of claim 14, wherein the node update logic is received based on at least the first state data.

20. The node of claim 14, wherein the node is restarted as part of updating the node logic.

* * * * *